United States Patent [19]

Hannecart et al.

[11] Patent Number: 5,284,723
[45] Date of Patent: Feb. 8, 1994

[54] ELECTROCHEMICAL ENERGY STORAGE DEVICES COMPRISING ELECTRICALLY CONDUCTIVE POLYMER AND THEIR USES

[75] Inventors: Etienne Hannecart, Tervuren; Elise Destryker, Sint-Pieters-Leeuw, both of Belgium; Jean Fauvarque, Paris, France; Anne de Guibert, Paris, France; Xavier Andrieu, Bretigny/Orge, France

[73] Assignees: Solvay & Cie (Societe Anonyme), Brussels, Belgium; Compagnie Generale d'Electricite (Societe Anonyme), Paris, France

[21] Appl. No.: 912,227

[22] Filed: Jul. 10, 1992

Related U.S. Application Data

[63] Continuation of Ser. No. 564,064, Aug. 8, 1990, abandoned.

[30] Foreign Application Priority Data

Jul. 14, 1989 [FR] France .................. 89 10952

[51] Int. Cl.⁵ .................. H01M 6/16; H01M 6/18
[52] U.S. Cl. .................. 429/213
[58] Field of Search .................. 429/213

[56] References Cited

U.S. PATENT DOCUMENTS

| | | |
|---|---|---|
| 4,547,270 | 10/1985 | Naarmann . |
| 4,697,000 | 9/1987 | Witucki et al. . |
| 4,781,443 | 11/1988 | Giles . |
| 4,818,646 | 4/1989 | Takakubo et al. . |
| 4,847,115 | 7/1989 | Warren et al. . |
| 4,892,678 | 1/1990 | Tanaka et al. . |
| 4,959,162 | 9/1990 | Armes et al. . |
| 4,985,124 | 1/1991 | Claussen et al. . |

FOREIGN PATENT DOCUMENTS

| | | |
|---|---|---|
| 0129070 | 12/1984 | European Pat. Off. . |
| 0253594 | 1/1988 | European Pat. Off. . |
| 0267392 | 5/1988 | European Pat. Off. . |
| 0280173 | 8/1988 | European Pat. Off. . |
| 0339341 | 4/1989 | European Pat. Off. . |
| 3305401 | 8/1984 | Fed. Rep. of Germany . |
| 3425511 | 1/1986 | Fed. Rep. of Germany . |
| 63-178442 | 1/1987 | Japan . |
| WO87/05914 | 10/1987 | PCT Int'l Appl. . |
| 2184738 | 1/1987 | United Kingdom . |

OTHER PUBLICATIONS

J. R. Reynolds et al., "Self-doped Conducting Copolymers. A Charge and Mass Transport Study of Poly(pyrrole-1-yl)propanesulfonate", Chemical Abstracts, vol. 109, No. 22, Nov. 1988, p. 649.

"A New Series of Conducting Polymers with Layered Structure: Poly-pyrrole N-Alkylsulfates and N-alkylsulfonates", Makromolekulare Chemie vol. 5, No. 3, Mar. 1984, pp. 157-164.

"Aqueous Dispersions of Electrically Conducting Monodisperse Poly-pyrrole Particles", Journal of Colloid and Interface Science, vol. 118 No. 2, Aug. 1987, pp. 411-416.

K. Yoshino et al., "Fusability of Polythiophene Derivatives With Substituted Long Alkyl Chain and Their Properties", Japanese Journal of Applied Physics/Part 2: Letters, vol. 26, No. 6, pp. L1038-L1039 (Jun. 1987).

R. Sugimoto et al., "Preparation of Soluble Polythiophene Derivatives Utilizing Transition Metal Halides as Catalysts and Their Property", Chemical Abstracts, vol. 106, No. 12, Abstract #85145f, p. 6 (1987).

Chemical Patents Index, Basic Abstracts Journal, Section A: PLASDOC, week 8742, abstract #AN-87-296490 (Dec. 16, 1987).

*Primary Examiner*—Asok Pal
*Attorney, Agent, or Firm*—Willian Brinks Hofer Gilson & Lione

[57] ABSTRACT

The invention relates to electrochemical energy storage devices containing a composition comprising an electrically conductive polymer based on polypyrrole, substituted or otherwise, and ionic groups which comprise an R-sulphate or R-sulphonate group, R denoting an alkyl or aryl radical.

The invention also relates to the use of these devices as a supercapacitor or as a rechargeable generator.

27 Claims, 4 Drawing Sheets

ELECTROCHEMICAL ENERGY STORAGE DEVICES COMPRISING ELECTRICALLY CONDUCTIVE POLYMER AND THEIR USES

This is a continuation application of application Ser. No. 07/564,064 filed Aug. 8, 1990, now abandoned.

BACKGROUND OF THE INVENTION

1. Field of the Invention

The present invention relates to electrochemical energy storage devices containing a composition comprising an electrically conductive polymer based on polypyrrole, substituted or otherwise, and ionic groups.

2. Description of the Prior Art

In patent application EP 0,300,330 (BASF Aktiengesellschaft) it has been proposed to employ electrically conductive polymers, such as especially polypyrrole, as active electrode material for producing electricity storage devices.

However, some electrical applications, such as the production of electrochemical storage systems of the type of capacitance or capacitor with a high energy density and a long cycle time,- require conductive polymers with special properties exhibiting developed morphologies.

These special properties are especially a high energy per unit mass and unit volume for applications in, energy sources feeding portable systems, a long lifetime of the pseudocapacitive type, and a high resistance of the polymer to aging over a wide range of storage temperature and conditions.

SUMMARY OF THE INVENTION

The developed morphology, for its part, is characterized especially by a suitable large pore volume and a suitable pore size distribution.

The present invention is aimed at providing new electrochemical energy storage devices containing a composition comprising an electrically conductive polymer based on pyrrole, which exhibit the abovementioned special properties.

The invention relates for this purpose to electrochemical energy storage devices containing a composition comprising:
an electrically conductive polymer chosen from polypyrrole and/or substituted polypyrrole and
ionic groups which comprise at least one R-sulphate or R-sulphonate group, R denoting an alkyl or aryl radical.

DESCRIPTION OF THE PREFERRED EMBODIMENTS

Figure 1:
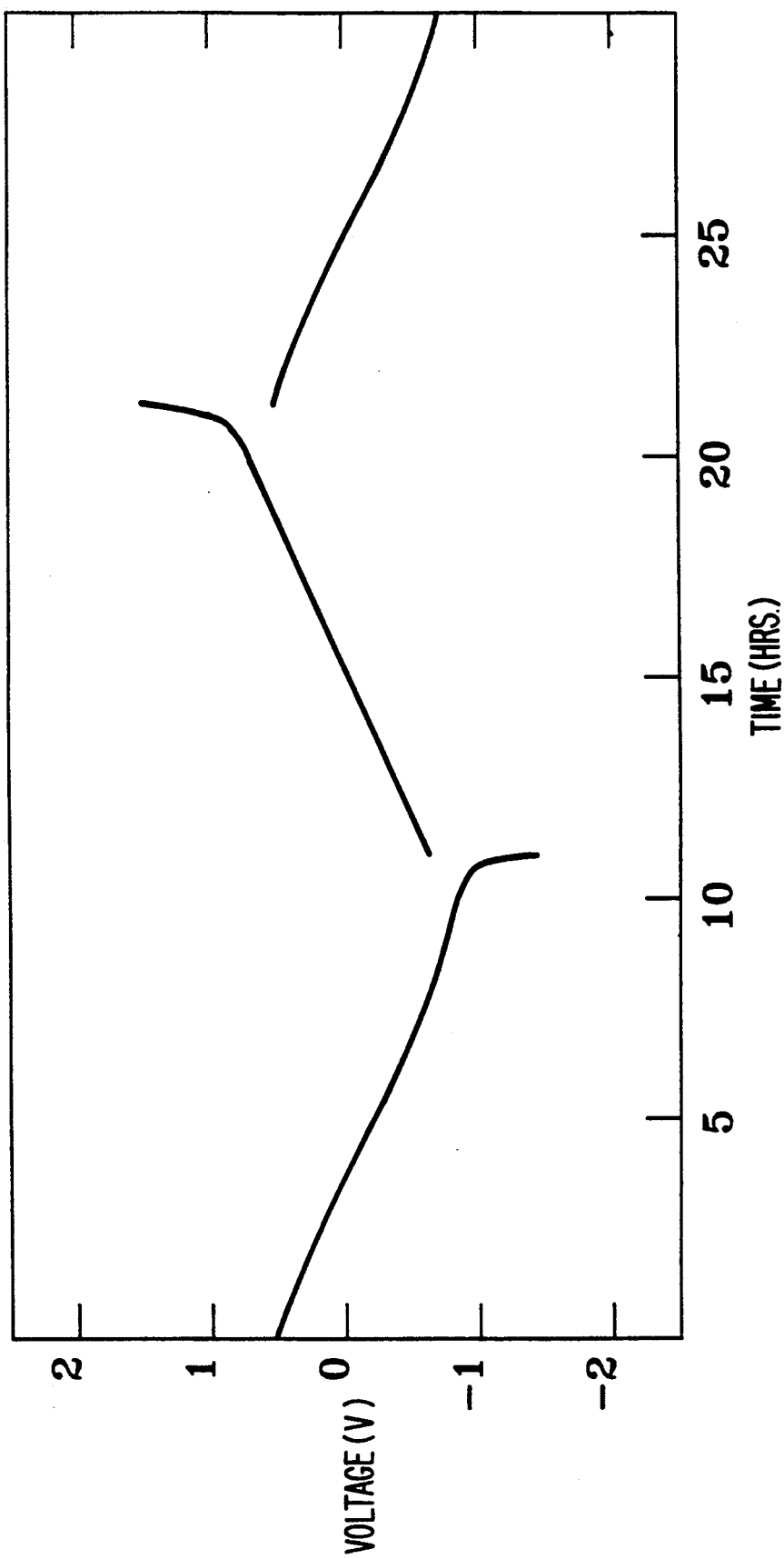
FIG. 1 is a cycle curve of the condenser described in Example 1, wherein the voltage (Y-axis) is shown as a function of time (X-axis)

Polypyrrole and/or substituted polypyrrole is intended to mean all the polymers originating from pyrrole and/or from substituted pyrroles, that is to say the homopolymers and the copolymers comprising pyrrole or substituted pyrrole units. Among the substituted pyrroles, those usually meant are the pyrroles substituted in the 3 or 3 and 4 positions and N-methylpyrrole. The best results have been obtained with unsubstituted pyrrole.

Generally:
when R denotes an alkyl radical, a branched or unbranched saturated aliphatic chain containing from 1 to 18 carbon atoms is chosen, which is substituted or unsubstituted by halogen atoms or cyclic groups, or
when R denotes an aryl radical, an aromatic radical such as the phenyl or benzyl radicals is chosen, these being substituted or unsubstituted by aliphatic chains.

Usually R denotes:
a branched or unbranched saturated aliphatic chain containing 6 to 12 carbon atoms, substituted or unsubstituted by atoms or groups such as halogens, or
a phenyl radical substituted or unsubstituted by a branched or unbranched, unsubstituted, saturated aliphatic chain containing from 1 to 16 carbon atoms.

R preferably denotes:
a branched or unbranched, saturated aliphatic chain containing 8 carbon atoms, and
a dodecylbenzene radical.

Particularly preferably R denotes:
the unbranched octyl radical, or
the 2-ethylhexyl radical.

Thus, good results have been obtained with the 2-ethylhexylsulphate, the octylsulphate, the dodecylbenzenesulphonate, the octylsulphonate, the dodecylsulphate, a mixture of dodecylbenzenesulphonate and of 2-ethylhexylsulphate or of dodecylbenzenesulphonate and of methanesulphonate.

The best results, however, have been obtained with the 2-ethylhexylsulphate.

The compositions which the devices according to the invention contain may advantageously contain other ionic groups of organic or inorganic origin. As an inorganic group, they usually contain a chloride, a sulphate or a nitrate and, as an organic group, groups of the trichloroacetate, phenylphosphonate, 2-glycerolphosphate, pentadecylsulphonate, hexadecylsulphonate, polyvinylsulphonate, polystyrenesulphonate, tosylate, and trifluoromethanesulphonate type. They preferably contain an inorganic group and more particularly a chloride group.

The compositions usually contain 0.01 to 0.9 parts of R-sulphate or R-sulphonate group per part of pyrrole and/or of substituted pyrrole, and preferably 0.05 to 0.5 and more particularly preferably 0.05 to 0.4.

The pore volume of the compositions used in the device according to the invention is usually greater than 1 cm$^3$ g$^{-1}$ and is preferably between 1.5 and 5 cm$^3$ g$^{-1}$. The best results have been obtained with a composition which has a pore volume greater than 3.5 cm$^3$ g$^{-1}$.

The compositions which the device according to the invention contain may be prepared by any process such as the processes described in U.S. Pat. No. 4,697,000 (Rockwell).

An advantageous process for the preparation of the compositions comprising an electrically conductive polymer consists of a chemical polymerization of pyrrole and/or of substituted pyrrole in an aqueous reaction medium between 5° and 40° C. and comprising an ionic compound containing an R-sulphate or R-sulphonate group, R being such as defined above, and ferric chloride.

These devices according to the invention can be employed for their electrical conductivity, electromagnetic absorption and thermal conductivity properties.

The composition comprising an electrically conductive polymer which the devices according to the invention contain is generally doped with cations or anions while the system is being charged or discharged; the cations or anions originate from the electrolyte.

The electrolytes are generally chosen from conductive salts of formula $C^+A^-$ in which $C^+$ is a cation and in which $A^-$ is an anion.

The cation $C^+$ is usually chosen from ammonium, alkaline-earth or alkali metal ions, $R_4N^+$ and $R_4P^+$ ions (R being an alkyl radical such as the ethyl and butyl radicals, for example), and preferably from the $Li^+$, $Na^+$ or $K^+$ cations or complex ions such as $(Bu)_4N^+$ or $(Et)_4N^+$, preferably introduced in the form of $LiClO_4$, $KPF_6$, $(Bu)_4NClO_4$ and $(Et)_4NClO_4$ in solution in a solvent such as acetonitrile, tetrahydrofuran, propylene carbonate, 2-methyltetrahydrofuran, dimethoxyethane or mixtures thereof.

The anion $A^-$ is chosen from the $ClO_4^-$, $AsF_6^-$, $SbF_6^-$, $SO_4^{2}$, $C_6H_5SO_3^-$, $BF_4^-$, $PF_6^-$, $CF_3SO_3^-$, $I_3^-$, $Br^-$ or $NO_3^-$ ions. The best results have been obtained with the $ClO_4^-$ ion.

These devices according to the invention may be advantageously employed in electrochemical storage systems of the capacitance or capacitor with a high energy density and long cycle time. The capacitors consist of two electrodes separated by an electrolyte; at least one of the two electrodes consists of the composition comprising an electrically conductive polymer. These electrochemical capacitors of high specific energy may be symmetrical capacitors (the two electrodes are identical) or unsymmetrical ones (the two electrodes are of different kinds).

In the case of an unsymmetrical capacitor, the counterelectrode consists either of a different conductive polymer or of an alkaline metal or an insertion compound. The counterelectrode can consist of a p-doped polymer such as especially the other electrically conductive polymers based on polypyrroles, substituted or otherwise, on polythiophenes, substituted or otherwise, on polyacetylene, on polyphenylene or on an aniline polymer.

These devices according to the invention can also be employed as batteries, rechargeable or otherwise, or an electrochemical generator or electrical cell or accumulator in which the anodes (or the cathodes) consist of electrodes consisting of or coated with films made of the compositions comprising an electrically conductive polymer, which are doped with anions (or with cations).

The devices according to the invention can in particular be employed as a supercapacitor or as a rechargeable generator.

Supercapacitors according to the invention have an electrode capacity per unit mass of at least 120 F/g of electrode. Preferred are supercapacitors having an electrode capacity per unit of mass comprised between 125 F/g and 350 F/g of electrode.

As concerns the rechargeable generators, they usually present a mass capacity of the element, restored in discharge, of at least 4 mA.h. Most preferred are rechargeable generators having a mean capacity of the element, restored in discharge, comprised between 5 and 10 mA.h.

The invention is illustrated by the following examples:

EXAMPLE 1

A. Preparation of the Polypyrrole Composition 750 ml of water and 15 ml (0.22 moles) of pyrrole are introduced under nitrogen atmosphere into a 4,000-ml 4-necked round bottom flask. To the reaction mixture thus obtained there are added, with stirring at 20° C. and over 15 minutes, 9.2 g (0.040 moles) of sodium 2-ethylhexylsulphate (sold by the Tensia Company under the trademark Tensatil DEH.120) and 148 g (0.55 moles) of ferric chloride ($FeCl_3.6H_2O$), the whole being dissolved in 250 ml of water.

The flask is stirred for 2 hours at 20° C.

The polymer composition obtained is filtered off and is then washed 3 times with 500-ml portions of water, 3 times with 500-ml portions of a 50/50 mixture of water and of methanol and then 3 times with 500-ml portions of methanol. This composition is then dried overnight under a vacuum of 20 mm Hg at 200° C.

A black powder is obtained in a yield of approximately 77% by weight of polymer calculated as undoped/monomer.

The final composition comprising the conductive polymer contains 62% of polypyrrole.

B. Device

A symmetrical supercapacitor is produced; the two electrodes are identical and made from the composition such as obtained above, but the composition is dried for 15 hours under vacuum (0.2 mm Hg) at 50° C.

This composition is then pressed at 20° C. for 20 seconds under a pressure of 650 kg per $cm^2$.

The tablet thus obtained is then impregnated with the electrolyte consisting of $LiClO_4$ in solution (1M) in propylene carbonate. The diameter of the tablet is 14 mm, this tablet forms the electrode and consists of 80 mg of doped polypyrrol.

The electrolytic separator consists of an electrolyte-impregnated polyamide felt; this felt is also used as electrolyte store.

The two electrodes and the electrolytic separator are stacked and fitted in a nickel casing 20 mm in diameter and 2 mm in thickness. A polypropylene seal provided the sealing after crimping. These operations are carried out in an anhydrous atmosphere at room temperature. An element which has the characteristics detailed below is thus obtained.

The series and transfer resistances measured in complex impedance between 65 kHz and 0.1 Hz are equal to 12 Ω and 70 Ω respectively.

A cycle curve of this condenser between −1.5 V and +1.5 V at 500 µA at 25° C. is shown in FIG. 1. In this figure the abscissae show the time in hours and the ordinates the voltage in volts.

The mean capacity of the element is 12.3 F, which corresponds to an electrode capacity per unit mass of 307 F/g of electrode, that is 128 A h/kg of electrode for an operating voltage difference of 1.5 V.

EXAMPLE 2

A. Preparation of the Composition

Example 1.A is repeated except where sodium 2-ethylhexylsulphate (0.040 moles) is concerned, which is replaced by sodium dodecylsulphate (0.011 moles).

B. Device

The device produced with the composition of the present example according to the methods of Example 1B has a mean element capacity of 7.5 F, which corresponds to an electrode capacity per unit mass of 180 F/g.

EXAMPLE 3

A. Preparation of the Polypyrrole Composition 750 ml of water and 15 ml (0.22 moles) of pyrrole are introduced under a nitrogen atmosphere into a 4,000-ml 4-necked round bottom flask.

To the reaction mixture thus obtained are added, with stirring at 20° C. and over 15 minutes, 11.3 g (0.044 moles) of sodium octylsulphate (product sold by the Henkel Company under the trademark Texapon 890) and 148 g (0.55 moles) of ferric chloride ($FeCl_3.6H_2O$), the whole being dissolved in 250 ml of water.

The flask is stirred for 2 hours at 200° C.

The polymer composition thus obtained is filtered off and is then washed 3 times with 500-ml portions of water, 3 times with 500-ml portions of a 50/50 mixture of water and of methanol and then 3 times with 500-ml portions of methanol.

The composition is then dried overnight under vacuum, 20 mm Hg at 200° C.

A black powder is obtained in a yield of approximately 75% by weight of polymer, calculated as undoped/monomer.

The final composition comprising the conductive polymer contains 57% of polypyrrole.

B. Device

This composition is used to produce a symmetrical supercapacitor whose two electrodes are identical and are made from this composition.

To do this, the composition is dried for 15 hours under vacuum (0.2 mm Hg) at 50° C.

This composition is then pressed for 20 seconds at 200° C. under a pressure of 650 kg/cm$^2$.

The tablet thus obtained is then impregnated with the electrolyte consisting of $LiClO_4$ in solution (1M) in propylene carbonate. The diameter of the tablet is 14 mm; this tablet forms the electrode and consists of 75 mg of doped polypyrrole.

The electrolytic separator consists of an electrolyte-impregnated polyamide felt; this felt is also used as an electrolyte store.

The two electrodes and the electrolytic separator are stacked and fitted in a nickel casing 20 mm in diameter and 2 mm in thickness. A polypropylene seal provides the sealing after crimping. These operations are carried out in an anhydrous atmosphere at room temperature. An element which has the characteristics detailed below is thus obtained.

The series and transfer resistances measured in complex impedance between 65 kHz and 0.1 Hz are equal to 18 Ω and 60 Ω respectively.

The mean capacity of the element is 9.36 F; this corresponds to an electrode capacity per unit mass of 234 F/g of electrode.

EXAMPLE 4

A. Preparation of a Polypyrrole Composition 750 ml of water and 15 ml (0.22 moles) of pyrrole are introduced under a nitrogen atmosphere into a 4,000-ml 4-necked round bottom flask.

To the reaction mixture thus obtained are added, with stirring at 20° C. and over 15 minutes, 5 g (0.022 moles) of sodium 2-ethylhexylsulphate (product sold by the Tensia Company under the trademark Tensatil DEH.120), 19 g (0.055 moles) of sodium dodecylbenzenesulphonate and 148 g (0.55 moles) of ferric chloride ($FeCl_3.6H_2O$) the whole being dissolved in 250 ml of water.

The flask is stirred for 2 hours at 200° C.

The polymer composition thus obtained is filtered off and is then washed 3 times with 500-ml portions of water, 3 times with 500-ml portions of a 50/50 mixture of water and of methanol and then 3 times with 500-ml portions of methanol.

This composition is then dried overnight under vacuum at 20° C. and at 20 Mm Hg.

A black powder is obtained in a yield of approximately 89% by weight of polymer, calculated as undoped/monomer.

The final composition comprising the conductive polymer contains 44% of polypyrrole.

B. Device

A rechargeable generator is produced with this composition. The negative electrode is made of pure lithium; this is a lithium disc 14 mm in diameter and 200 μm in thickness. The positive electrode is made from the composition such as obtained above.

To do this, the composition is dried for 15 hours under vacuum (0.2 mm Hg) at 50° C. and is then pressed for 20 seconds at 200° C. under a pressure of 650 kg per cm$^2$.

The tablet thus obtained is then impregnated with the electrolyte consisting of $LiClO_4$ in solution (1M) in propylene carbonate. The diameter of the tablet is 14 mm; this tablet forms the positive electrode and contains 73 mg of doped polypyrrole.

The electrolytic separator consists of an electrolyte-impregnated polyamide felt; this felt is also used as an electrolyte store.

The two electrodes and the electrolytic separator are pressed together and fitted in a nickel casing 20 mm in diameter and 2 mm in thickness. A polypropylene seal provides the sealing after crimping. These operations are carried out in a glovebox under an argon atmosphere at room temperature. An element which has the characteristics detailed below is thus obtained.

After fitting, the measured open circuit voltage is 3.20 V.

The series and transfer resistances measured in complex impedance between 65 kHz and 0.1 Hz are equal to 20 Ω and 900 Ω respectively.

Figure 3:
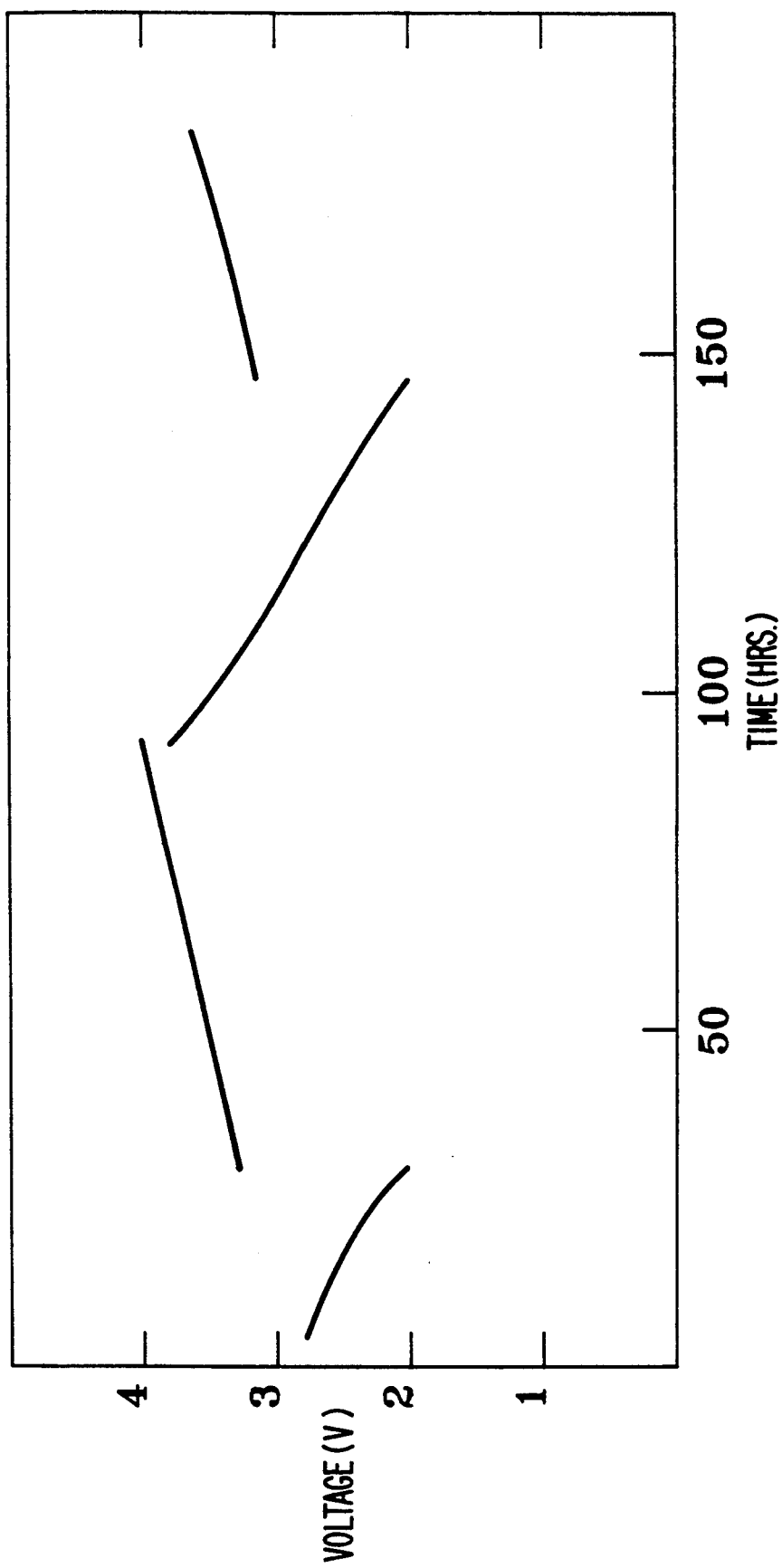
FIG. 3 is a cycle curve of the condenser described in Example 4, wherein the voltage (Y-axis) is shown as a function of time (X-axis)

A cycle curve of this condenser between 2 V and 4 V at 100 μA at 25° C. is shown in FIG. 3. In this figure, the abscissae show the time in hours and the ordinates the voltage in volts.

The mean capacity of the element, restored in discharge, is 5.4 mAh, which corresponds to a capacity per unit mass of the positive electrode comprising the dopant of 74 A h/kg of electrode.

EXAMPLE 5

A. Preparation of the Polypyrrole Composition

Example 4.A is repeated except insofar as the sodium 2-ethylhexylsulphate and sodium dodecylbenzenesulphonate are concerned, which are replaced by 45 ml of a 1.22M solution of sodium methanesulphonate (0.055 moles) and by 19 g (0.055 moles) of sodium dodecylbenzenesulphonate

B. Device

The tablet forming the positive electrode, produced according to the method of example 4. B, contains 88 mg of polypyrrole.

The measured open circuit voltage is 3.23 V.

The series and transfer resistances measured in complex impedance between 65 kHz and 0.1 Hz are equal to 20 Ω and 800 Ω respectively.

Figure 4:
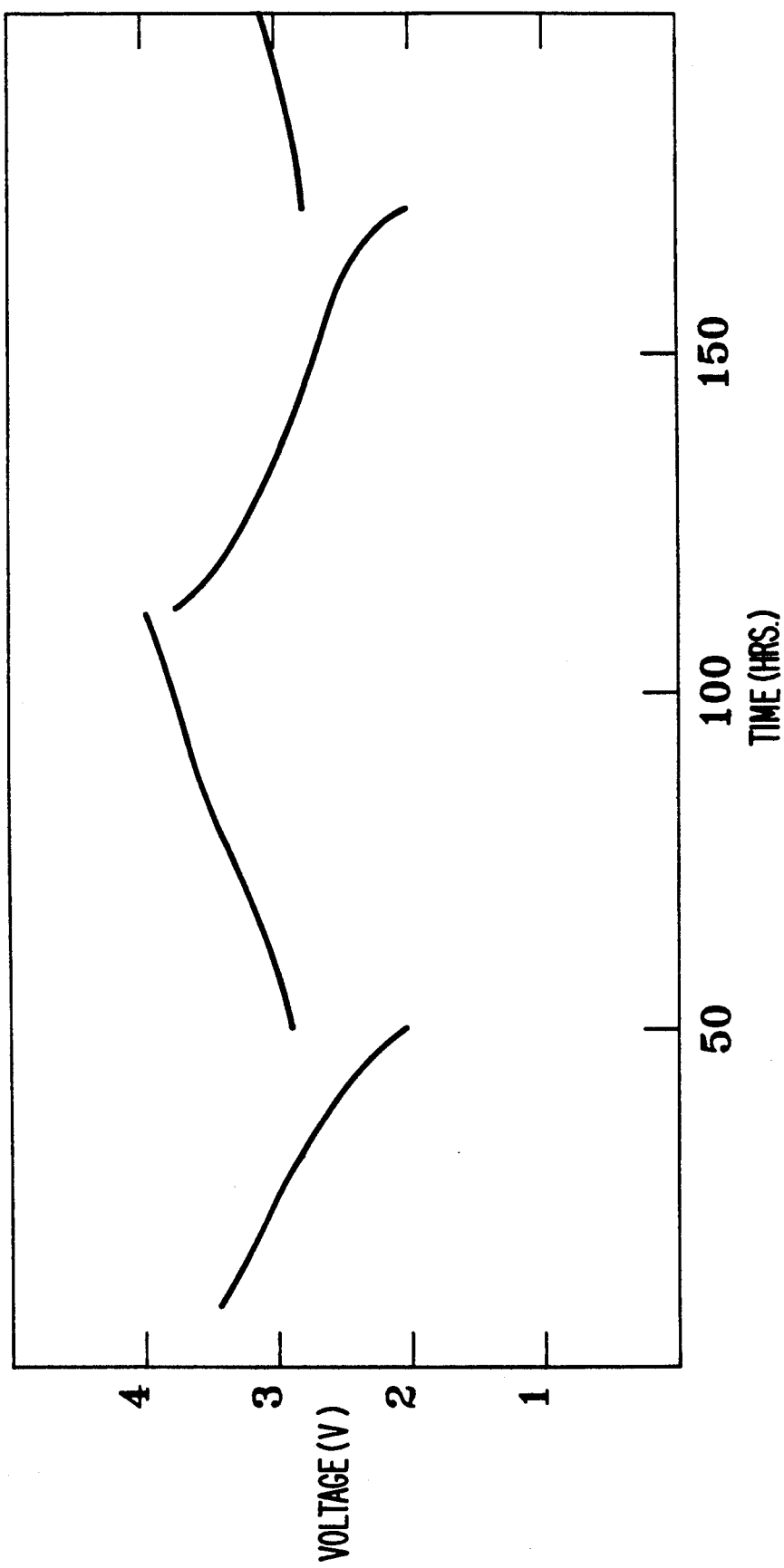
FIG. 4 is a cycle curve of the condenser described in Example 5, wherein the voltage (Y-axis) is shown as a function of time (X-axis).

A cycle curve of this condenser between 2 V and 4 V at 100 μA at 25° C. is shown in FIG. 4. In this figure the abscissae show the time in hours and the ordinates the voltage in volts.

The mean capacity of the element, restored in discharge, is 6 mA h, which corresponds to a capacity per unit mass of the positive electrode comprising the dopant of 68 A h/kg of electrodes.

EXAMPLE 6

A. Preparation of the Polypyrrole Composition

Example 1.A is repeated, except insofar as the sodium 2-ethylhexylsulphate (0.040 moles) is concerned, which is replaced by sodium dodecylbenzenesulphonate (0.022 moles).

B. Device

The series and transfer resistances of a tablet produced according to the method of example 1.B, measured in complex impedance between 65 kHz and 0.1 Hz are equal to 11 Ω and 50 Ω respectively.

Figure 2:
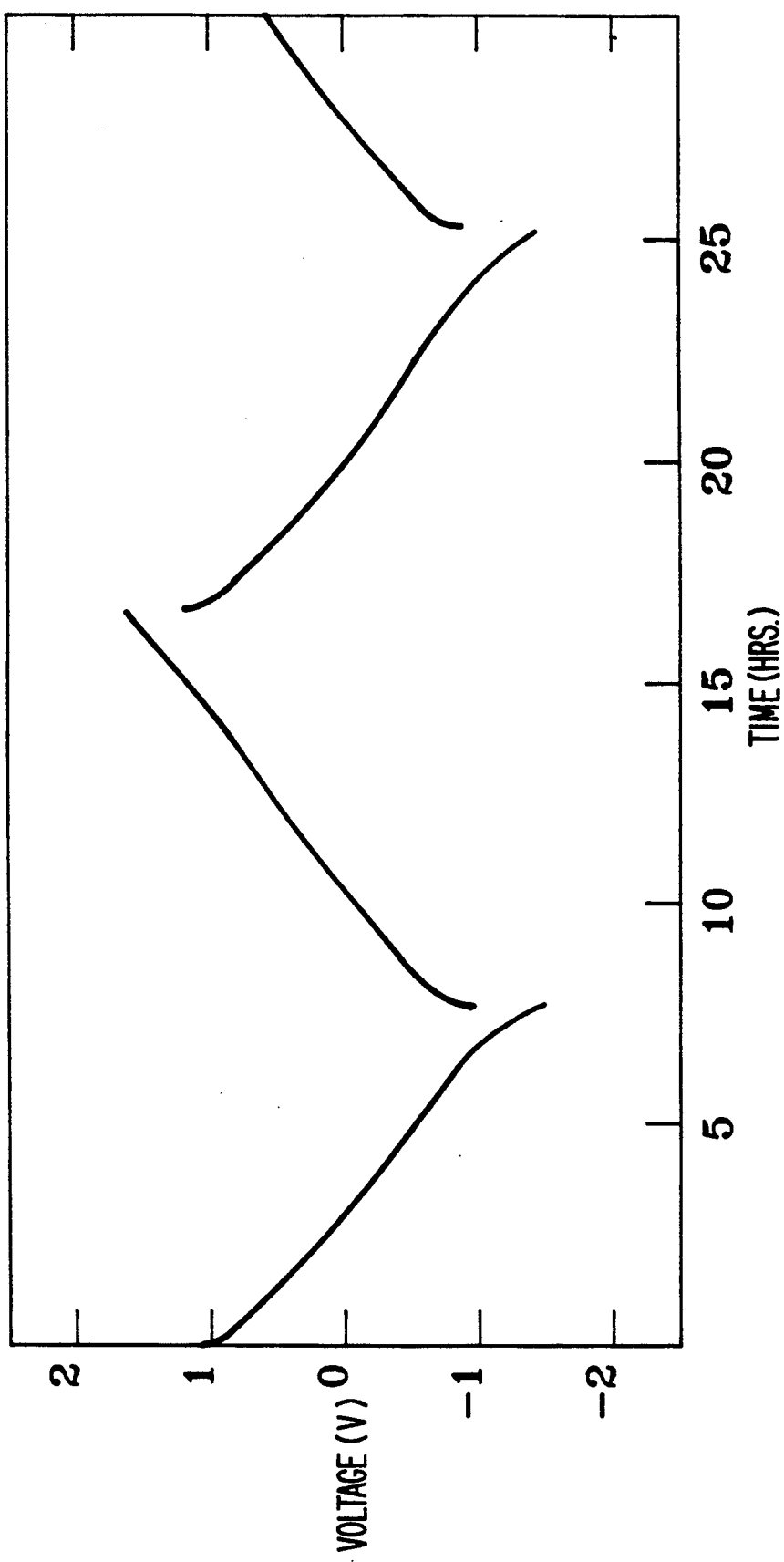
FIG. 2 is a cycle curve of the capacitor described in Example 6, wherein the voltage (Y-axis) is shown as a function of time (X-axis)

A cycle curve of this capacitor between −1.5 V and +1.5 V at 500 μA at 25° C. is shown in FIG. 2. In this figure the abscissae show the time in hours and the ordinates show the voltage in vol-ti.

The mean capacity of the element is 7.25 F, which corresponds to an electrode capacity per unit mass of 180 F/g of electrode, that is 75 A h/kg of electrode for an operating voltage difference of 1.5 V.

We claim:

1. An electrochemical supercapacitor for storing electrical energy comprising:
   (a) an electrically conductive polymer selected from the group consisting of polypyrrole, substituted polypyrrole, and a mixture of polypyrrole and substituted polypyrrole;
   (b) at least one ionic compound containing at least one R-sulphate or R-sulphonate group, with R denoting an alkyl or aryl radical; and
   (c) at least one ionic compound which contains a chloride group.

2. The electrochemical super-capacitor according to claim 1, wherein the ionic compound of (b) contains an octylsulphate or 2-ethylhexylsulphate group.

3. The electrochemical super-capacitor according to claim 1, wherein the ionic compound of (b) contains a dodecylbenzenesulphonate group.

4. The electrochemical supercapacitor according to claim 1, comprising one or two electrodes consisting of or coated with films of the polymer of (a).

5. The electrochemical supercapacitor according to claim 4, wherein the polymer of (a) is doped with cations or anions.

6. The electrochemical supercapacitor according to claim 5 wherein said supercapacitor has electrode capacity per unit mass of at least 120 F/g of electrode.

7. The electrochemical supercapacitor according to claim 4 wherein the two electrodes are identical.

8. The electrochemical supercapacitor according to claim 1 containing the R-sulphate or R-sulphonate group in the amount of about 0.01 to about 0.9 parts per part of pyrrole units present in the polypyrrole, in the substituted polypyrrole or in the mixture of polypyrrole and substituted polypyrrole.

9. The electrochemical supercapacitor according to claim 1 containing the R-sulphate or R-sulphonate group in the amount of about 0.05 to about 0.5 parts per part of pyrrole units present in the polypyrrole, in the substituted polypyrrole or in the mixture of polypyrrole and substituted polypyrrole.

10. The electrochemical supercapacitor according to claim 1 containing the R-sulphate or R-sulphonate group in the amount of about 0.05 to about 0.4 parts per part of pyrrole units present in the polypyrrole, in the substituted polypyrrole or in the mixture of polypyrrole and substituted polypyrrole.

11. The electrochemical supercapacitor according to claim 1, wherein in the ionic compound of (b) R is selected from the group consisting of an unbranched octyl radical and a 2-ethylhexyl radical.

12. The electrochemical supercapacitor according to claim 11, wherein the ionic compound of (b) contains a 2-ethylhexylsulphate group.

13. A method of storing electrical energy, which comprises the step of providing electrical current to an electrochemical supercapacitor having two electrodes, one of said electrodes including a composition comprising:
   (a) an electrically conductive polymer selected from the group consisting of polypyrrole, substituted polypyrrole, and a mixture of polypyrrole and substituted polypyrrole;
   (b) at least one ionic compound containing at least one R-sulphate or R-sulphonate group, with R denoting an alkyl or aryl radical; and
   (c) at least one ionic compound which contains a chloride group.

14. The method according to claim 13, wherein the electrodes are identical.

15. The method according to claim 13, wherein the R-sulphate or R-sulphonate group is an octylsulphate group, a 2-ethylhexylsulphate group, or a dodecylbenzenesulphonate group.

16. The method according to claim 13, wherein the electrically conductive polymer is doped with cations or anions.

17. The method according to claim 13, wherein the composition contains about 0.01 to about 0.9 parts of R-sulphate or R-sulphonate group per part of pyrrole units present in the polypyrrole, in the substituted polypyrrole or in the mixture of polypyrrole and substituted polypyrrole.

18. A method of storing electrical energy, which comprises the step of providing electrical current to an electrochemical rechargeable generator having two electrodes, one of said electrodes including a composition comprising:
  (a) an electrically conductive polymer selected from the group consisting of polypyrrole, substituted polypyrrole, and a mixture of polypyrrole and substituted polypyrrole;
  (b) at least one ionic compound containing at least one R-sulphate or R-sulphonate group, with R denoting an alkyl or aryl radical; and
  (c) at least one ionic compound which contains a chloride group.

19. The method according to claim 18, wherein the R-sulphate or R-sulphonate group is an octylsulphate group, a 2-ethylhexylsulphate group, or a dodecylbenzenesulphonate group.

20. The method according to claim 18 wherein the two electrodes are identical.

21. The method according to claim 18, wherein the electrically conductive polymer is doped with cations or anions.

22. The method according to claim 18, wherein the composition contains about 0.01 to about 0.9 parts of R-sulphate or R-sulphonate group per part of pyrrole units present in the polypyrrole, in the substituted polypyrrole or in the mixture of polypyrrole and substituted polypyrrole.

23. A method of providing an electrochemical supercapacitor for storing electrical energy comprising:
  (a) providing two electrodes, one or said electrodes including a composition comprising:
    (i) an electrically conductive polymer selected from the group consisting of polypyrrole, substituted polypyrrole, and a mixture of polypyrrole and substituted polypyrrole;
    (ii) at least one ionic compound containing at least one R-sulphate or R-sulphonate group, with R denoting an alkyl or aryl radical; and
    (iii) at least one ionic compound which contains a chloride group; and
  (b) providing an electrolyte separating the two electrodes.

24. A method of providing a rechargeable generator for storing electrical energy comprising:
  (a) providing two electrodes, one of said electrodes including a composition comprising:
    (i) an electrically conductive polymer selected from the group consisting of polypyrrole, substituted polypyrrole, and a mixture of polypyrrole and substituted polypyrrole;
    (ii) at least one ionic compound containing at least one R-sulphate or R-sulphonate group, with R denoting an alkyl or aryl radical; and
    (iii) at least one ionic compound which contains a chloride group; and
  (b) providing an electrolyte separating the two electrodes.

25. An electrochemical supercapacitor for storing electrical energy comprising:
  (a) electrically conductive polymer selected from the group consisting of polypyrrole, substituted polypyrrole, and a mixture of polypyrrole and substituted polypyrrole;
  (b) at least one ionic compound containing a 2-ethylhexylsulphate group, a dodecylsulphate group, an octylsulphate group, or an octylsulphonate group; and
  (c) at least one ionic compound which contains a chloride group.

26. The electrochemical supercapacitor according to claim 25, wherein the ionic group of (b) contains a 2-ethylhexylsulphate group.

27. An electrochemical supercapacitor for storing electrical energy comprising:
  (a) an electrically conductive polymer of pyrrole;
  (b) sodium 2-ethylhexylsulphate; and
  (c) ferric chloride.

* * * * *

UNITED STATES PATENT AND TRADEMARK OFFICE
CERTIFICATE OF CORRECTION

PATENT NO. : 5,284,723
DATED : February 8, 1994
INVENTOR(S) : Etienne Hannecart et al.

It is certified that error appears in the above-indentified patent and that said Letters Patent is hereby corrected as shown below:

Col. 1, line 25, after "time," delete the dash

Col. 1, line 30, after "in" delete the comma

Col. 5, line 29, change "200°" to "20°"

Col. 5, line 36, change "200°" to "20°"

Col. 5, line 50, change "200°" to "20°"

Col. 6, line 18, change "200°" to "20°"

Col. 6, line 41, change "200°" to "20°"

Signed and Sealed this

Eleventh Day of October, 1994

*Attest:*

BRUCE LEHMAN

*Attesting Officer*   *Commissioner of Patents and Trademarks*